United States Patent [19]

Mitchell et al.

[11] 4,210,935

[45] Jul. 1, 1980

[54] L-SHAPED BRACKET ASSEMBLY AND RIMBAND TYPE IMPLOSION-RESISTANT CATHODE RAY TUBE

[75] Inventors: Robert B. Mitchell, Seneca Falls; Harry R. Swank, Waterloo, both of N.Y.

[73] Assignee: GTE Products Corporation, Stamford, Conn.

[21] Appl. No.: 941,622

[22] Filed: Sep. 12, 1978

[51] Int. Cl.$^{2}$ .................................... H04N 5/65

[52] U.S. Cl. .................................... 358/246; 220/2.1 A

[58] Field of Search .................................... 358/246; 220/2.1 A

[56] References Cited

U.S. PATENT DOCUMENTS

| | | | |
|---|---|---|---|
| 3,777,057 | 12/1973 | Abe | 358/246 |
| 3,845,530 | 11/1974 | Platt | 358/246 |

*Primary Examiner*—Howard W. Britton

*Attorney, Agent, or Firm*—Thomas H. Buffton

[57] ABSTRACT

An implosion-resistant cathode ray tube includes an envelope having a substantially rectangular-shaped viewing portion with corners having a given radius of curvature blending into a flattened portion, a pair of rimbands affixed to the viewing portion, a bracket member having a rounded base portion affixed to the rimband and of a width to permit a metal band member to encircle and compress the base portion and contact the rimband on the radius of curvature of the corner and prior to the flattened portion of the envelope.

11 Claims, 3 Drawing Figures

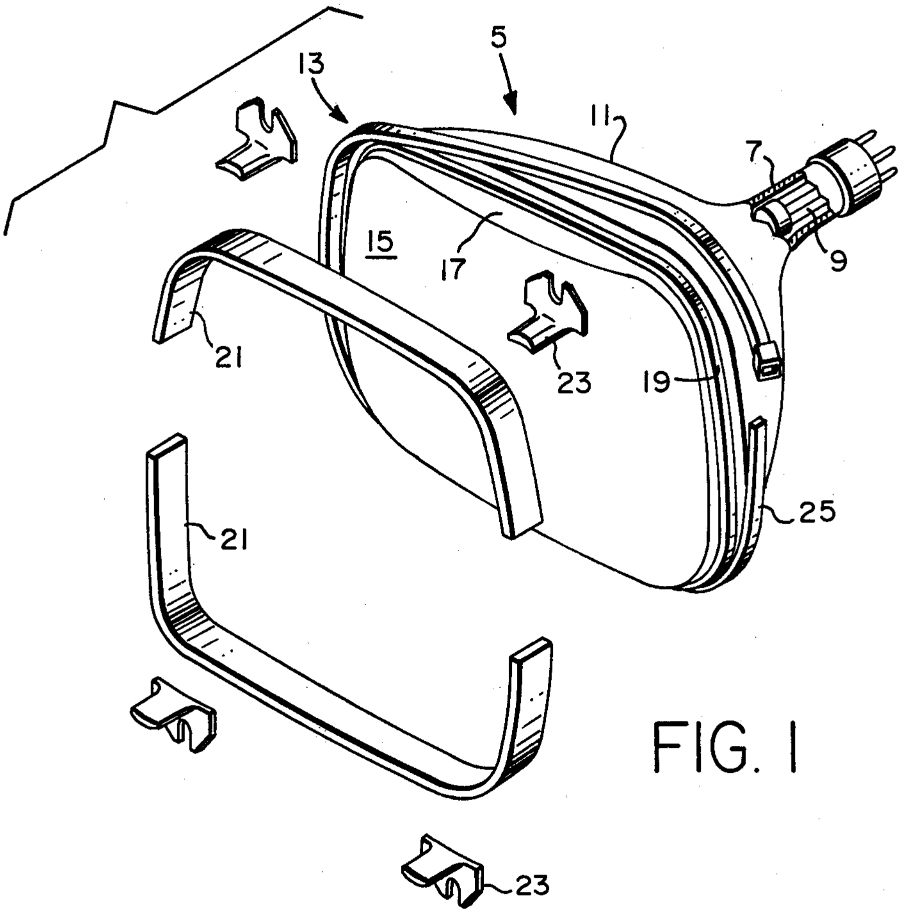
FIG. 1
FIG. 3
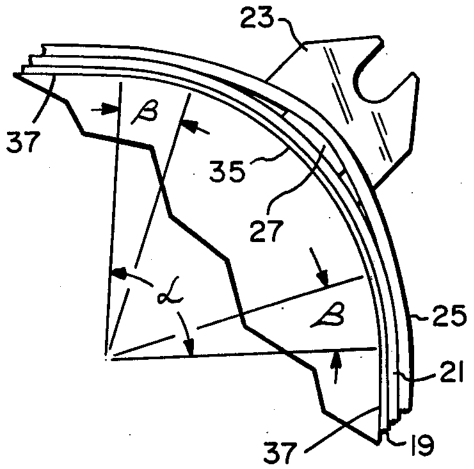
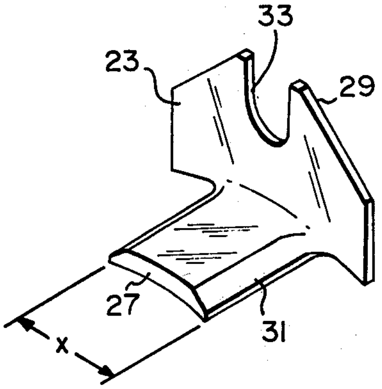
FIG. 2

L-SHAPED BRACKET ASSEMBLY AND RIMBAND TYPE IMPLOSION-RESISTANT CATHODE RAY TUBE

CROSS REFERENCE TO OTHER APPLICATIONS

A concurrently filed application entitled "Implosion-Resistant Cathode Ray Tube Structure and Fabrication Process", bearing U.S. Ser. No. 941,623 filed Sept. 12, 1978, in the names of the present inventors and assigned to the same Assignee relates to an improved structure having ear members affixed by a single metal band.

TECHNICAL FIELD

This invention relates to cathode ray tubes and more particularly to implosion-resistant cathode ray tube structures having affixed rimbands and "L"-shaped bracket assemblies suitable for supporting the cathode ray tube structure.

BACKGROUND OF THE INVENTION

In the area of implosion-resistant cathode ray tube structures, it is known to provide substantially "L"-shaped bracket members having a base portion and an upstanding attachment portion affixed thereto. The upstanding attachment portion usually has a hole or slot and is formed to fit over a bolt or some similar supportive means. Also, the base portion is normally welded to a rimband and the rimband and base portion are encircled and compressed by a metal band member. Thus, the bracket member supports the cathode ray tube while the compressive force exerted on the rimband and evacuated envelope by the metal band enhances the implosion protection and inhibits flying glass particles upon sudden rupture of the evacuated envelope.

Present-day cathode ray tube structures normally have a substantially rectangular-shaped viewing portion which extends to an upstanding rectangular-shaped flange member. The rimbands, normally two half-shells, may have an ear member welded to each corner, and adhesive is applied thereto, and the half-shells encircle the rectangular-shaped flange member. Thereafter, a metal band is applied under tension to the rimbands and exerts a compressive force thereon.

Although such structures have been and still are extensively employed in fabricating implosion-resistant cathode ray tubes, it has been found that such structures do leave something to be desired. More specifically, it has been found that the normal dimensional tolerances encountered in fabricating the envelope tend to cause vairations in the positional location of the rimbands and rigidly affixed "L"-shaped brackets. Even if the positional location of the rigidly affixed "L"-shaped bracket members is rigidly controlled, as is necessary in order to provide for proper alignment with a supporting structures, it has been found that the rimbands tend to "buckle" whenever the compressive force of the metal band is applied due to the strap tending to "draw" the rimband around the corners. As a result, the implosion-resistant capabilities as well as the appearance of the structure are deleteriously affected.

Additionally, it has also been found that the jointure of the radius of curvation of the envelope corners and the flattened portion extending from the jointure is a critical area in so far rupture and implosion of the evacuated envelope is concerned. Thus, it is important that the compressive force exerted on the rimbands and the envelope be effected on the radius of curvature of the corners prior to the flattened portion of the envelope. Therefore, the size and configuration of the base portion of the "L"-shaped bracket member becomes especially significant.

SUMMARY OF THE INVENTION

In one aspect of the invention, an implosion-resistant cathode ray tube includes a substantially rectangular-shaped envelope whereon is affixed a pair of half-shell rimbands. The rectangular-shaped envelope has corners with a given radius of curvature extending into a flattened portion and the base portion of an "L"-shaped bracket member is disposed intermediate the rimband and an encircling metal band exerting a compressive force thereon. The base portion is of a size and at a location such that the metal band contacts the rimband on the radius of curvature and prior to the flattened portion of the envelope.

BRIEF DESCRIPTION OF THE DRAWINGS

FIG. 1 is an exploded view of a typical cathode ray tube employing a rimband and an "L"-shaped bracket member and having implosion-resistant capabilities;

FIG. 2 illustrates a preferred form of "L"-shaped bracket member; and

FIG. 3 is an enlarged partial front elevation illustrating a preferred embodiment of the invention.

PREFERRED EMBODIMENT OF THE INVENTION

For a better understanding of the present invention, together with other and further objects, advantages and capabilities thereof, reference is made to the following disclosure and appended claims in connection with the accompanying drawings.

Referring to FIG. 1 of the drawings, an implosion-resistant cathode ray tube includes an evacuated envelope 5 having a neck portion 7 containing a sealed in electron gun 9 and extending to a flared or funnel-like portion 11. A face panel 13 includes a substantially rectangular-shaped viewing portion 15 which extends to a rectangular-shaped upturned flanged portion 17. In turn, the upturned flanged portion 17 is affixed or frit sealed to the flared or funnel-like portion 11.

An adhesive 19, such as a double-sided tape for example, is adhered to the flanged portion 17 of the envelope 5. A pair of half-shell rimbands 21 are encircled about the adhesive 19 and flanged portion 17. Also, a bracket member 23, welded or preferably having an adhesive (not shown) affixed to one surface is positioned on the rimbands 21 on at least one of the corners thereof. Moreover, a metal band member 25 encircles and compresses the bracket members 23 and rimbands 21 onto the flanged portion 17 of the envelope 5.

As to the bracket member 23, FIG. 2 illustrates a preferred embodiment wherein an "L"-shaped bracket member 23 has a base portion 27 and an upstanding portion 29. The base portion 27 has a rounded edges 31 in order to reduce the frictional resistance thereof when encircled by the metal band member 27. Moreover, the upstanding portion 29 includes a slot 33 which is formed for attachment of the "L"-shaped bracket member 23 to an external support means (not shown).

As can readily be seen, the "L"-shaped bracket member 23 has a base portion 27 of a width "X" which is relatively narrow with respect to the upstanding portion 29. Also, the width "X" of the base portion 27 is preferably in the range of about 0.35 to 0.65 inches for cathode ray tubes having a diagonal measurement from about 13 to 25 inches. Thus, the relatively narrow width "X" of the base portion 27 in combination with the rounded edges 31 enhance the relatively limited distortion of an encircling metal band member 25.

Regarding the distortion of the metal band member 25, the enlarged partial elevation view of FIG. 3 more clearly illustrates the relatively small distortion thereof due to the improved "L"-shaped bracket member 23. It is to be noted that the flanged portion 17 includes a corner portion 35 having a given radius of curvature formed by an angle $\alpha$ which is preferably in the range of about 78 to 85 degrees. This corner portion 35 blends into a relatively flattened portion 37 immediately adjacent thereto.

Importantly, the rimbands 21 are reasonably flexible and contoured to reasonably conform to the configuration of the corner and flattened portions 35 and 37. Also, the base portion 27 with the rounded edges 31 is positionally located on the corner portion 35 in contact with the rimband 21. Moreover, the metal band member 25 encircles the rimbands 21 and base portion 27 of the bracket member 23 and compressively forces the base portion 27 against the rimbands 21 and the rimband 21 against the corner and flattened portion 35 and 37 of the envelope 5.

It has been found that the location whereat the corner portion 35 blends into the flattened portion 37 is particularly susceptible to failure and implosion whenever the enevelope 5 is shocked. Moreover, this failure characteristics can be minimized and the implosion resistance enhanced by insuring that the metal band member 25 contacts the rimbands 21 on the radius of curvature of the corner portion 35 and prior to reaching the flattened portion 37 of the envelope 5. Preferably, the encircling metal band member 25 contacts the rimbands 21 on the given radius of curvature of the corner portion 35 and at an angle $\beta$ in the range of about 10 to 15 degrees prior to reaching the positional location whereat the corner portion 35 blends with the flattened portion 37.

While there has been shown and described what is at present considered the preferred embodiment of the invention, it will be obvious to those skilled in the art that various changes and modifications may be made therein without departing from the invention as defined by the appended claims.

INDUSTRIAL APPLICABILITY

Thus, there has been provided a unique implosion-resistant cathode ray tube structure suitable for use in television receivers. The structure utilizes the well-known rimband construction in conjunction with a unique bracket member whereby a compressive force is exerted on the envelope in a manner which enhances the implosion resistance of the structure. Moreover, the compressive force developed by the encircling metal band is improved in uniformity, consistency and reliability due to the improved bracket member configuration.

We claim:

1. In an implosion-resistant cathode ray tube having an evacuated envelope with a face panel sealed to a flared neck portion wherein said flared neck portion has an electron gun assembly sealed therein and said face panel has a substantially rectangular-shaped viewing portion extending to an upturned flanged portion with corners having a given radius of curvature extending into a flattened portion, a pair of rimbands contacting said flanged portion, and a metal band encircling and exerting a compressive force on the rimbands and upturned flanged portion of the face panel the improvement comprising at least one substantially "L"-shaped bracket member having a base portion connected to an upstanding attachment portion with the base portion positionally located and compressively held intermediate said rimbands and said metal band at said corner of said face panel and of a size to provide contact of said encircling metal band and said rimbands at a point on said given radius of curvature of said corner and prior to said flattened portion of said flanged portion of said face panel.

2. In the implosion-resistant cathode ray tube of claim 1, the improvement wherein said base portion of said "L"-shaped bracket member includes an adhesive means whereby attachment to said rimband is enhanced by compressive force exerted by said metal band.

3. In the implosion-resistant cathode ray tube of claim 1, the improvement wherein said face panel includes four corners with an "L"-shaped bracket member having a base portion positioned intermediate said metal band and a point on said rimband and said metal band contacting said corner on said given radius of curvature and prior to said flattened portion of said flanged portion of said face panel.

4. In the implosion-resistant cathode ray tube of claim 1, the improvement wherein said base portion of said "L"-shaped bracket member is tapered insuring contact of said metal band on said rimband at a point on said given radius of curvature and prior to said flattened portion of said flanged portion of said face panel.

5. In the implosion-resistant cathode ray tube of claim 1, the improvement wherein said corners of said face panel have a radius of curvature formed by an angle in the range of about 78 to 85 degrees and said base portion of said "L"-shaped bracket member is of a size to provide contact of said metal band and said rimbands at a point on said radius of curvature of said corners.

6. In the implosion-resistant cathode ray tube of claim 1, the improvement wherein said base portion of said "L"-shaped bracket member is of a width in the range of about 0.35 to 0.65 inch.

7. In the implosion-resistant cathode ray tube of claim 1, the improvement wherein said base portion of said "L"-shaped bracket member is of a size to provide contact of said metal band and said rimbands at a point on said given radius of curvature of said corners within an angle of about 5 to 15 degrees prior to the extremities of said radius of curvature.

8. In the implosion-resistant cathode ray tube of claim 1, the improvement wherein said base portion of said "L"-shaped bracket member is welded to said rimband.

9. In an implosion-resistant cathode ray tube having an evacuated envelope with a face panel sealed to a flared neck portion wherein the face panel has a viewing portion extending to an upstanding flanged portion having corners with a given radius of curvature extending into a flattened portion, a pair of rimbands affixed to the flanged portion, and a metal band encircling and exerting a compressive force on the rimbands, the improvement comprising an "L"-shaped bracket member having a base portion connected to an upstanding attachment portion with said base portion disposed intermediate said metal band and rimbands, said base portion having tapered sides with an adhesive means affixed thereto and of a size and positioned to provide contact of said metal band and rimbands at a point on said given radius of curvature of said corners.

10. In the implosion-resistant cathode ray tube of claim 9, the improvement wherein said corners of said face panel have a radius of curvature formed by an angle in the range of about 78 to 85 degrees and said point of contact of said metal band and said rimbands is on said given radius of curvature.

11. In the implosion-resistant cathode ray tube of claim 9, the improvement wherein said base portion of said "L"-shaped bracket member is of a size to provide contact of said metal band and said rimbands at a point on said radius of curvature within an angle in the range of about 5 to 15 degrees of the extremities of said radius of curvature.

* * * * *